US012645985B2

(12) United States Patent
Ferreira et al.

(10) Patent No.: US 12,645,985 B2
(45) Date of Patent: Jun. 2, 2026

(54) DISTRIBUTED DATASET DISTILLATION FOR EFFICIENT BOOTSTRAPPING OF OPERATIONAL STATES CLASSIFICATION MODELS

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1294 days.

(21) Appl. No.: 17/447,980

(22) Filed: Sep. 17, 2021

(65) Prior Publication Data

US 2023/0103817 A1 Apr. 6, 2023

(51) Int. Cl.
| | |
|---|---|
| *G06F 9/445* | (2018.01) |
| *G06F 9/4401* | (2018.01) |
| *G06N 20/00* | (2019.01) |

(52) U.S. Cl.
CPC ........... *G06N 20/00* (2019.01); *G06F 9/4401* (2013.01)

(58) Field of Classification Search
CPC .................................................... G06N 20/00
USPC ........................................................ 717/174
See application file for complete search history.

(56) References Cited

U.S. PATENT DOCUMENTS

| | | | |
|---|---|---|---|
| 11,004,025 B1 | 5/2021 | Gottin et al. | |
| 11,182,321 B2 | 11/2021 | Pinho et al. | |

| | | | | |
|---|---|---|---|---|
| 11,218,500 | B2 | 1/2022 | Soeder et al. | |
| 11,275,987 | B1 | 3/2022 | Gottin et al. | |
| 11,403,525 | B2 | 8/2022 | Gottin et al. | |
| 11,562,223 | B2 | 1/2023 | Gottin et al. | |
| 11,586,919 | B2 * | 2/2023 | Zhu ........................ | G06Q 10/06 |
| 12,061,991 | B2 * | 8/2024 | Chen ...................... | G06V 20/70 |
| 2015/0356461 | A1 * | 12/2015 | Vinyals ................. | G06N 3/084 |
| | | | | 706/12 |
| 2018/0293146 | A1 * | 10/2018 | Ushiki ............... | G06F 11/3072 |
| 2020/0272526 | A1 * | 8/2020 | Bhole ................. | G06F 11/3409 |
| 2022/0067527 | A1 * | 3/2022 | Xu .......................... | G06N 3/048 |

(Continued)

FOREIGN PATENT DOCUMENTS

| | | | | |
|---|---|---|---|---|
| AU | 2020353380 A1 * | 4/2022 | ............. | G06N 3/045 |

OTHER PUBLICATIONS

T. Wang, J. Zhu, A. Torralba and A. Efros, "Dataset distillation," arXiv, vol. preprint arXiv:1811.10959., 2018.

(Continued)

*Primary Examiner* — Evral E Bodden
(74) *Attorney, Agent, or Firm* — Workman Nydegger

(57) ABSTRACT

One example method includes, at a node, installing a default parametrization configuration that facilitates performance of a domain task, obtaining, by the node, a distilled dataset, and obtaining the distilled dataset is either: obtaining the distilled dataset from another node; or leveraging a synthetic state assembled in the node to select the distilled dataset from another node based on state similarity of the node to the another node. The example method further includes training a model at the node, and the training is performed using the distilled dataset, and the trained model is operable to leverage information received by the node to propose changes to the parametrization configuration so as to optimize execution of a task by the node.

20 Claims, 9 Drawing Sheets

(56) References Cited

U.S. PATENT DOCUMENTS

| 2023/0004854 | A1 | 1/2023 | Calmon et al. |
| 2023/0066249 | A1 | 3/2023 | Ferreira et al. |
| 2023/0229919 | A1* | 7/2023 | Kar ..................... G06V 10/764 |
| | | | 706/11 |

OTHER PUBLICATIONS

F. Zhuang, Z. Qi, K. Duan, D. Xi, Y. Zhu, H. Zhu, H. Xiong and Q. He, "A comprehensive survey on transfer learning," Proceedings of IEEE, vol. 109, No. 1, pp. pp. 43-76., 2020.

* cited by examiner

DISTRIBUTED DATASET DISTILLATION FOR EFFICIENT BOOTSTRAPPING OF OPERATIONAL STATES CLASSIFICATION MODELS

FIELD OF THE INVENTION

Embodiments of the present invention generally relate to predicting an operational state of newly deployed computing systems and components. More particularly, at least some embodiments of the invention relate to systems, hardware, software, computer-readable media, and methods for determining an operational state of the newly deployed entity by bootstrapping the newly deployed entity using historical data from previously deployed entities.

BACKGROUND

Recognizing relevant operational states of an entity, such as a computational node for example, is beneficial or required for many control tasks. Because operational states are defined both in terms of telemetry information as well as provenance, such as the recent history, parametrization and results of the services and workloads serviced by the system, they capture relevant contextual cues for management and orchestration of complex systems. However, problems can arise when attempting to define an operational state of an entity.

One such problem concerns that fact that data for training operational states model in newly deployed nodes may not be available. In particular, an already deployed system may use collected historical data to train a model to classify the operational states from the telemetry and provenance information. Newly deployed nodes, however, cannot leverage such a model for management and orchestration for a long while if they are required to train a model from their own data. This poses the additional problems described below.

One of these problems concerns data constraints. Particularly, a model for a newly deployed node might consider the experiences of multiple previously deployed models at other, similar, nodes. In other words, to obtain good production performance, the model needs to leverage information from a large amount of data. However, the required storage for such a dataset might be cost prohibitive or simply impossible given the node compute configuration.

Another problem with conventional approaches concerns communication costs and delays. Particularly, transmitting enough data for the training of a model, from similar nodes to a newly deployed node, may impose significant communication costs. The selection of which nodes should send data, and the management of the transmission itself, may further impose additional processing costs or delays.

A further problem relates to data privacy guarantees. In many domains, the data from existing nodes may be required to be kept private. In these instances, the leveraging of data from existing nodes for bootstrapping models in newly deployed nodes is not straightforward.

Another example of problems with conventional approaches concerns storage constraints typically encountered in compute nodes. Particularly, in many domains, the nodes may generate a significant volume of data, to the point where no node may be able to keep sufficient historical data to capture its complete historical profile. Hence, no nodes may contain necessary/important data for the training of a bootstrap model for a newly deployed node. This also relates to communication costs, since transferring large amounts of data for training may impose significant computing overhead.

A final example of problems with conventional approaches concerns the time needed by a node to train a machine learning (ML) model at the node. Particularly, the training process may be slowed, or prevented, by slow transfer of historical data to be used in the training.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
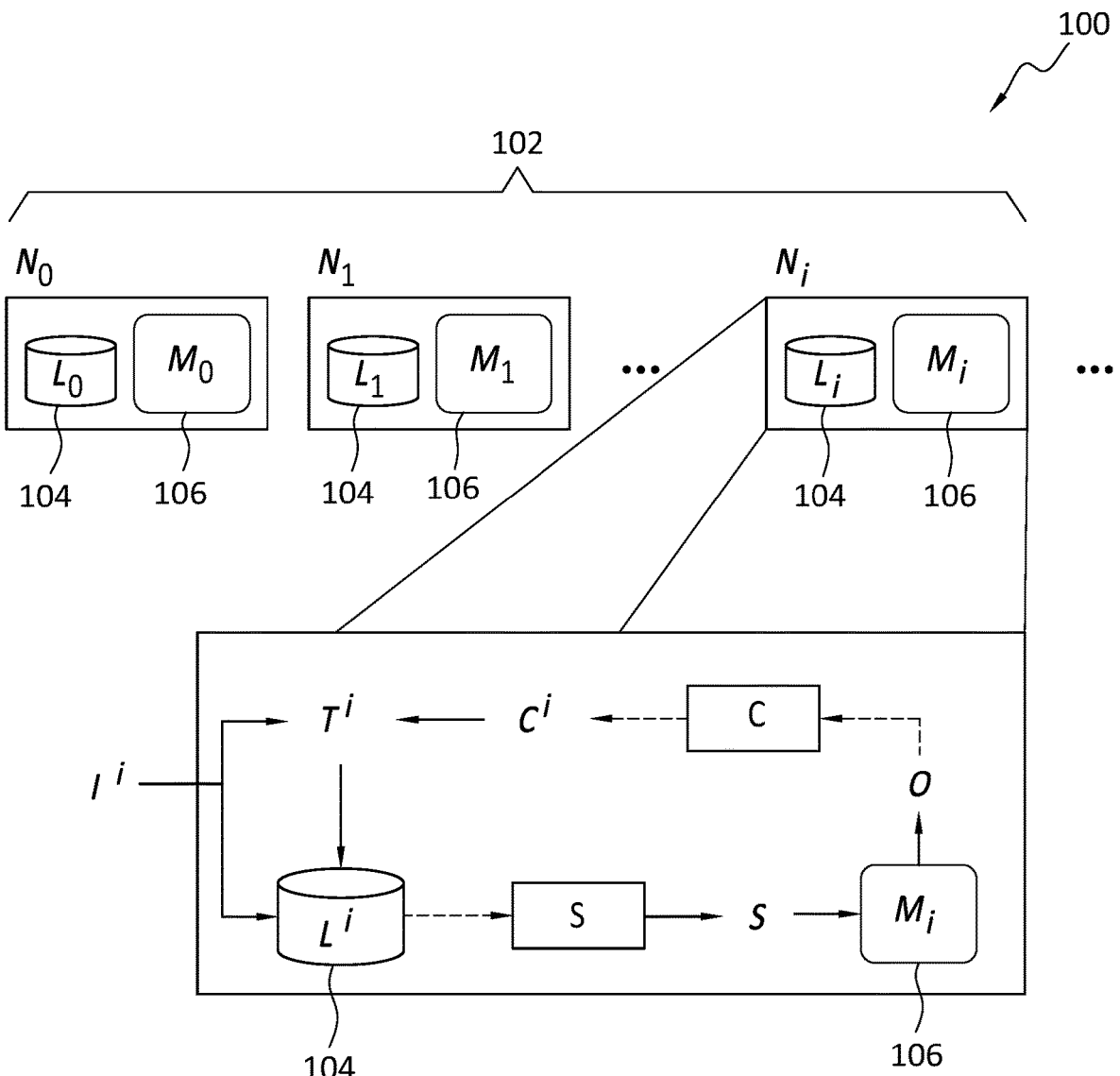
FIG. 1 discloses a high-level representation of a system comprising many nodes with shared underlying data formats and mechanisms.

Embodiments of the present invention generally relate to predicting an operational state of newly deployed computing systems and components. More particularly, at least some embodiments of the invention relate to systems, hardware, software, computer-readable media, and methods for determining an operational state of the newly deployed entity by bootstrapping the newly deployed entity using historical data from previously deployed entities.

In general, example embodiments of the invention are directed to a framework that leverages dataset distillation of historical data available on previously deployed systems to efficiently bootstrap models for newly deployed systems in order to predict operational states. More specifically, example embodiments implement an approach in which deployed systems periodically perform dataset distillation to capture their historical data, such as telemetry and/or provenance information. These distilled data may comprise a much smaller dataset, possibly by orders of magnitude, than the original that allows for a quick bootstrap of a family of ML (Machine Learning) models that may operate to classify input data into operational states of an entity. As such, example embodiments may provide for an orchestration framework to enable knowledge sharing from many known systems, with a privacy enhancing approach, to classify operational states in computational nodes, and thus allowing for the optimization of domain control tasks.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that embodiments may implement an orchestration framework that enables knowledge sharing from a plurality of systems to allow for efficient, privacy-enhancing, training of models to predict operational states. An embodiment may provide efficiency and model readiness through boot strap training that may take place either in the newly deployed node, if a distilled dataset is obtained from another node, or at an already deployed node. In this way, the distilled dataset may be obtained from a variety of sources. An embodiment may enable a node to quickly and effectively bootstrap itself into a desired operational state so that the node is able to support needed operations in a timely and effective manner. Various other advantageous aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Predicting or recognizing relevant operational states in independent computational nodes is desirable for many kinds of controllers and optimization processes, such as deployed storage systems with cache management policies, for example. In general, operational states may comprise telemetry information, but also provenance, such as recent history, parametrization and results of the services and workloads serviced by a system, as well as contextual, such as configuration variables. Example embodiments concern the task of orchestrating models for predicting operational states based on telemetry and provenance information.

In more detail, a computational node may use collected historical data to train a model to classify the operational states from the telemetry and provenance information. Consider, however, a new system- or one that has been reassigned to a new organization or workload pattern and will, therefore, experience unknown telemetry and provenance scenarios. A new model according to example embodiments may consider the experiences of multiple previously deployed models, but in such a way that does not raise anonymity and compliance issues with data sharing between systems that might, for instance, belong to different organizations. Furthermore, storing sufficient historical data to capture the complete historical profile of known deployed systems can be costly, as would be transferring such large amounts of data for training. Thus, at least some embodiments may be considered as addressing at least two considerations, namely, bootstrapping models for newly deployed systems, and the data constraints involved, such as communication costs; privacy guarantees, and node storage constraints.

With the foregoing in view, some example embodiments are directed to the task of predicting operational states in computational nodes that operate independently but may share data or underlying mechanisms. Recognizing relevant operational states in computer systems is desirable for many kinds of controllers and optimization processes. As used herein, an "operational state" refers to a meaningful classification of telemetry and provenance information for relevant control task(s) in a domain. The operational state may be determined from gathered data, such as telemetry data and provenance data for example, with respect to one or more control tasks.

Example embodiments may be applicable to multiple different scenarios. Each scenario may define parameters, such as the computational node, the shared data formats or underlying mechanism(s), and the control task, that determine the operational state of an entity such as a computing node. For the purposes of discussion, the following examples are considered: (i) an edge environment in which nodes perform inference over a set of sensors' data; (ii) deployed storage systems in which cache management policies are affected by parametrization depending on the kinds of traces processed by the system; (iii) containerized environments in which policies determine dynamic resource allocation for each computational node; and, (iv) dynamic resource allocation for concurrent workload optimization in distributed environments.

In general, example embodiments may operate to enable new nodes, such as computing nodes, in a system, to bootstrap a model for recognizing operational states of the new nodes. In some embodiments, an already deployed node may use locally collected historical data to train a model to classify the operational states, from the telemetry and provenance information, with respect to a control task, relying on ML model training. Consider, however, a new node, or a node that has been reassigned to a new organization or workload pattern and will, therefore, experience unknown telemetry and provenance scenarios. The new/reassigned node may not possess readily available data from its own operations to compose such a model. It may take a long time for the operation of the system to accrue enough data for the training of a model that achieves reasonable predictive accuracy. Thus, example embodiments are directed to, among other things, an approach that leverages dataset distillation of historical data available on previously deployed nodes to efficiently bootstrap models for newly deployed/reassigned nodes.

B. Related Materials

Following is a brief discussion of materials related to the present disclosure. This discussion is not intended to be, nor should be construed as, an admission that any of such materials constitute prior art.

An example embodiment may relate to systems which comprise some form of operational states composition from machine learning models. These include: workload characterization for storage systems (U.S. application Ser. No. 16/671,617—"Sequentiality Profile and Sequentiality Signature for the Characterization of I/O Workloads"); deep reinforcement learning for storage systems (U.S. application Ser. No. 16/889,104—"Deep Reinforcement Learning for Dynamic Tuning of Cache Parameters"); workload telemetry fingerprinting in computing clusters (U.S. application Ser. No. 16/832,031—"Dynamic Resource Allocation Based on Fingerprint Extraction of Workload Telemetry Data"); operational states composition for workload optimization (U.S. application Ser. No. 15/961,033, "Efficient Robust Deep-Reinforcement Learning for Workflow Optimization"); workflow simulation (U.S. application Ser. No. 15/800,587—"Simulation-Based Online Optimization of Workflows"); and, resource bottleneck detection in workflow executions (U.S. application Ser. No. 16/527,353—"Provenance-Based Task Bottlenecks Detection Using Traces of Batches of Workflow Executions"). All of the materials in this paragraph are incorporated herein in their respective entireties by this reference.

An example embodiment may relate to dataset distillation, a process in which a model may be pre-trained to high accuracy from very few data (see T. Wang, J. Zhu, A. Torralba and A. Efros, "*Dataset distillation,*" *arXiv, vol. preprint arXiv:*1811.10959., 2018). All of the materials in this paragraph are incorporated herein in their respective entireties by this reference.

An example embodiment may relate to transfer learning topics of model deployment and bootstrapping (see F. Zhuang, Z. Qi, K. Duan, D. Xi, Y. Zhu, H. Zhu, H. Xiong and Q. He, "*A comprehensive survey on transfer learning,*" *Proceedings of IEEE*, vol. 109, no. 1, pp. pp. 43-76., 2020.). All of the materials in this paragraph are incorporated herein in their respective entireties by this reference.

C. Aspects of Some Example Embodiments

In general, at least some example embodiments provide an approach in which deployed nodes periodically perform dataset distillation to capture their historical data, such as telemetry and/or provenance information for example. These distilled data may comprise a much smaller dataset, by orders of magnitude, than the original dataset, which may allow for a relatively quick bootstrap of a family of machine learning (ML) models that may operate to classify input data into operational states of a node, such as a computing node for example.

When a new computing system is deployed, distilled data of known systems may be gathered by a central node and used to efficiently pre-train an operational state ML classifier that can then be shared with the newly deployed system. From then on, the model on the new computing system may be used for transfer learning, classification and fine tuning on newly available data at the newly deployed system. In one alternative approach, the central node may apply a distilled data aggregation procedure, such as a random shuffling in one embodiment, and send the resulting data to the newly deployed system to enable the newly deployed system to fine tune its current model. This alternative approach may avoid security pitfalls that result in conventional transfer learning, and this alternative approach may provide strong privacy, since the aggregated distilled data may not contain easily reversible or derivable information, that is, information that allows reconstruction of the original data of any of the originally known systems.

As noted above, some example embodiments may employ dataset distillation in some cases, although that is not required. In some implementations of dataset distillation, the focus may be on identifying a relatively small synthetic dataset that, when used to train a model, would yield low error. That is, in some data distillation processes this inquiry is not used to identify a small sample of the dataset, nor a compression of the full dataset. Rather, the focus may be on building a sketch, that is a distilled dataset, that may be representative of the full dataset, in order to approximate a function, or model. Note that the distilled dataset may not need to come from the same distribution as the original data. In some instances a reduction on the order of up to 1000× less data may be an adequate amount of data to bring a model quickly to reasonable low error. In some cases, a distilled dataset may be obtained through a double optimization process, which may begin with a synthetic random dataset, such as white noise images for example, then optimizes a model with a known real dataset, and then calculates a loss on the current synthetic dataset. Next, the process may optimize with respect to the synthetic dataset on this calculated loss. One can sample many different models in this optimization process in order to obtain a distilled dataset that is robust to in-distribution changes to a family of models.

As also noted above, some example embodiments may employ transfer learning, although that is not required. Transfer learning may relate to model deployment and bootstrapping, one or both of which may be employed in some embodiments. In general, model deployment and bootstrapping may enable a decrease in the requirement for historical data for model training and deployment. In transfer learning, a new system may leverage a previously trained model to quickly obtain a new model, fine-tuning the model to the new domain over time. However, these techniques, when conventionally employed, typically present data security pitfalls and do not provide strong privacy guarantees. These techniques also assume locally collected data for the fine-tuning, but the collection of such data may take considerable time and may postpone the readiness of the models at new deployed nodes. Thus, example embodiments pre-train a model, that may be obtained from distilled datasets at edge nodes, and such embodiments and model may accordingly provide relatively stronger privacy guarantees, as compared with other, different, approaches. The resulting model generated by example embodiments may be fine-tuned, but this is not required. Embodiments may be used in tandem with transfer learning in at least one configuration such as, for instance, in the characterization of telemetry in storage systems, where example embodiments may leverage learning done for many systems in a given family to be transferred to newly deployed systems.

C.1 Example Model-Based Configuration

Aspects of some embodiments may be illustrated with one or more examples. Thus, and with reference to FIG. 1, consider a system 100 in which several nodes N 102 are deployed. Each node $N_i$ 102 collects its local telemetry data—respective to its computational resources—and provenance information into a respective local database $L_i$ 104. Each node 102 may further contain a respective model $M_i$ 106 that classifies telemetry and provenance information into operational states that can be used to parametrize the system and task. This is disclosed in FIG. 1.

Particularly, FIG. 1 discloses high-level representation of a system 100 comprising many nodes 102 with shared underlying data formats and mechanisms. Node $N_i$ is highlighted to show the relationship between $L^i$ and $M^i$ and other aspects related to the task $T^i$ performed by the node 102. Such other aspects may include, for example, the input $I^i$, the parameter configuration $C^i$, and procedures C and S.

A purpose of the model M 106 in each node 102, may be to leverage recent telemetry and provenance data, which may include a mix of metadata, input, and output of the task T, to propose changes to the parameter configuration C so as to optimize the future execution of T. The recent telemetry and provenance data may come from the particular node 102 that includes a model M, and/or from one or more other nodes 102 that include their own respective models M.

The configuration C may relate, for example, to arguments to the task T itself, the adoption of policies, or to definition of constraints over the allocation of computational resources within the node. For disambiguation, it is noted that the task T performed by the nodes, as in some of example use cases, may itself comprise the training of models and/or the application of models for inference. In that case, that model may be determined by the configuration C.

In FIG. 1, S is may be a predetermined procedure for composing the telemetry and provenance data in $L_i$ into an appropriate format for being used as input to a model $M_i$. This formatted input may be referred to as a state s. The model Mi may then output a classification of that state s. This classification may be referred to as an operational state. The explicit output of the model M may be represented as an operational state o that is provided as input to a procedure C which, in turn, may suggest and/or enactchanges to the current configuration of the system $C^i$ based on that classification.

The procedure S may be domain-dependent and tied to the model Mi. The procedure C may likewise be domain-dependent, and tied to both the possible configurations $C^i$ as well as to the output of the model M. Notice that embodiments may define the operational states, that is, the possible "classes" of states the model attributes to the current telemetry and provenance data, with respect to the effects of the configuration $C^i$ in the task $T^i$.

In the various aforementioned definitions, it may be assumed that the nodes share an underlying definition of the data formats, as well as underlying mechanisms. That is, while nodes may perform different respective tasks T, consuming respective distinct input data I, with different respective resources, the various nodes may regardless generate comparable telemetry and provenance results in their local respective databases L. To this end, embodiments may specify that the different sets of features (both telemetry and provenance) that may be collected by different nodes are globally known. With the global sets of features known, each feature may be uniquely identified across all nodes, so as to enable an assumption that nodes that deal with similar features can be mapped to a common set of operational states. Similarly, even though nodes may perform different tasks, the set of tasks may be assumed to be known globally. Finally, it may be assumed that there is no incoherence or inconsistency between tasks and their input and resource requirements. That is, for example, if a same task is performed by two nodes, then those two nodes may be assumed to use similar computational resources and, therefore, the same kinds of telemetry data may relate to that task in both nodes. This may also mean that if a same task is performed by two nodes, then both nodes collect similar provenance. These assumptions may ensure the generalization of the experiences of existing nodes for the bootstrapping of models in new/modified nodes.

Following is a description of example management and orchestration process that may be applied at a node:

1. New input samples are made available in $I^i$
2. Task $T^i$ is performed with those new samples and current parametrization configuration $C^i$
3. The input, output and metadata from the execution of $T^i$, along with matching telemetry information from the computational resources at the node, are stored in $L_i$
4. A known procedure S that transforms those data into an appropriate input for the model is applied—this formatted data comprises a state s.
5. A state is provided as input to model $M_i$. This may not take place immediately after the previous step—the usage of the model may only take place periodically, after a predetermined time has passed, after every k iterations of the task $T^i$, or even depending on some decision process that considers characteristics of the output of $T^i$ (such as drift detection mechanisms determining that a new model is required)
6. The output of Mi may be used to alter the current parametrization $C^i$.
   a. This may be subject to other constraints—such as not altering the parametrization if the magnitude of the changes are below a predetermined threshold; and not altering the parametrization for a currently executing task $T^i$
   b. This may rely on actuation mechanisms that enact changes automatically, or even comprise indications for a human operator to assess.

It is noted that a node may be required to store a large historical dataset. While a large dataset $L_i$ is not necessarily required for the management and orchestration operations described above, as it may suffice to compose the input to the model $M_i$ with the most current samples in $L_i$, a sufficiently representative set of data in $L_i$ may be required for the training of $M_i$. This may be particularly relevant if re-training of the model $M_i$ is ever necessary.

C.2 Local Dataset Distillation

Figure 2:
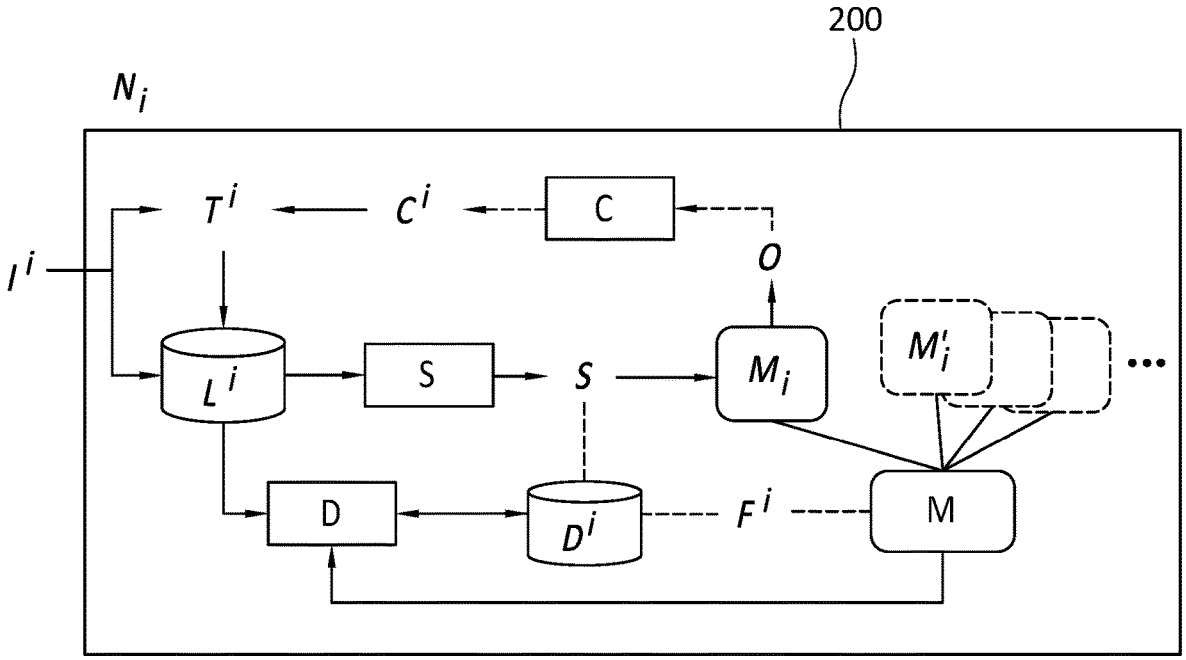
FIG. 2 discloses the contents of a node extended from assumed definitions to include dataset distillation process D, a distilled dataset Di, and a family of models M.

The definitions of the domain, as described above, may be expanded to encompass a process of local dataset distillation by each node. This is represented in FIG. 2. Particularly, FIG. 2 discloses the contents of a node 200 extended from assumed definitions to include dataset distillation process D, a distilled dataset Di, and a family of models $\mathbb{M}$..

In some example embodiments, the node 200 may further comprise a module D that performs the dataset distillation, yielding a distilled dataset $D^i$. This dataset is built with respect to a family of models $\mathbb{M}$.. Both $D^i$ and $\mathbb{M}$ may relate to, that is, determine and/or are determined by, the same set of data features, as such are defined by the states s, inputs to the models in $\mathbb{M}$.. These relationships are represented in FIG. 2 by dashed lines. Notice that the actual model $M_i$ deployed at the node is one of the models derived from $\mathbb{M}$..

Formally, the family of models $\mathbb{M}$ may determine a probability distribution over the weights of a model structure (see T. Wang, J. Zhu, A. Torralba and A. Efros, "*Dataset distillation,*" *arXiv*, vol. preprint arXiv:1811.10959., 2018).

With continued reference to the example of FIG. 2, the management and orchestration steps described above in connection with Figure may be adapted to additionally include:

7. The available samples in $L^i$ may be used in a dataset distillation process with respect to models described by $\mathbb{M}$::

a. The process may leverage an existing distilled dataset $D^i$, if it exists, and fine-tune it, or b. The process may alternatively create a distilled dataset $D^i$ from scratch.

It is noted that the distilled dataset $D^i$ may comprise a much smaller set, such as by orders of magnitude, than $L_i$. Thus, the approach implemented by example embodiments may not impose significant storage requirements on the node. As well, as the dataset distillation process D may be performed iteratively, over time, the existing samples in $L_i$ may be discarded after they are used by $M_i$ without worry— the distilled dataset $D^i$ that remains can be used for the re-training of $M_i$, if necessary.

Note further that while the distilled samples in $D^i$ may share the same features $F^i$ as the states s, the distilled samples are not actual states composed from the experienced telemetry and provenance at the node. Rather, the distilled samples may be an encoded, compacted representation of the features $F^i$ that allow for the quick training of models conforming to $\mathbb{M}$..

In similar fashion to the enactment of changes in parametrization configuration performed by C, the process of dataset distillation performed by D may be subject to checks of resource availability/idleness at the node. This may be particularly important for nodes that have limited computational resources for machine learning training tasks, which may be required for the dataset distillation process. Note that when there is no availability of resources for the dataset distillation module to act, the input and provenance data in $L^i$ may typically not be discarded, but stored and made available for later iterations of step 7 (described above).

Finally, this local approach may be integrated with system-wide orchestration for global efficiency purposes. An integrated approach may be adapted to encompass cross-communication between nodes, for orchestration, so that no redundant distilled datasets are generated, for example. Example embodiments may be directed particularly to cross-node orchestration related to the bootstrapping of models for newly deployed nodes, as described in the following section.

C.3 Example Bootstrapping Model

In a system comprising multiple nodes using models for parametrization adaptation there are at least two cases in which new models may be required, particularly:

Scenario 1.—case where an existing node Ni must redeploy a fresh (re-trained) model $M_i$. This may happen due to concept drift in the deployed model, for example. The re-training may take place at the node itself, leveraging the telemetry and provenance data in $L_i$; and Scenario 2.—case of a newly deployed node for which no data is available and, thus, the newly deployed node must obtain a model.

Figure 3:
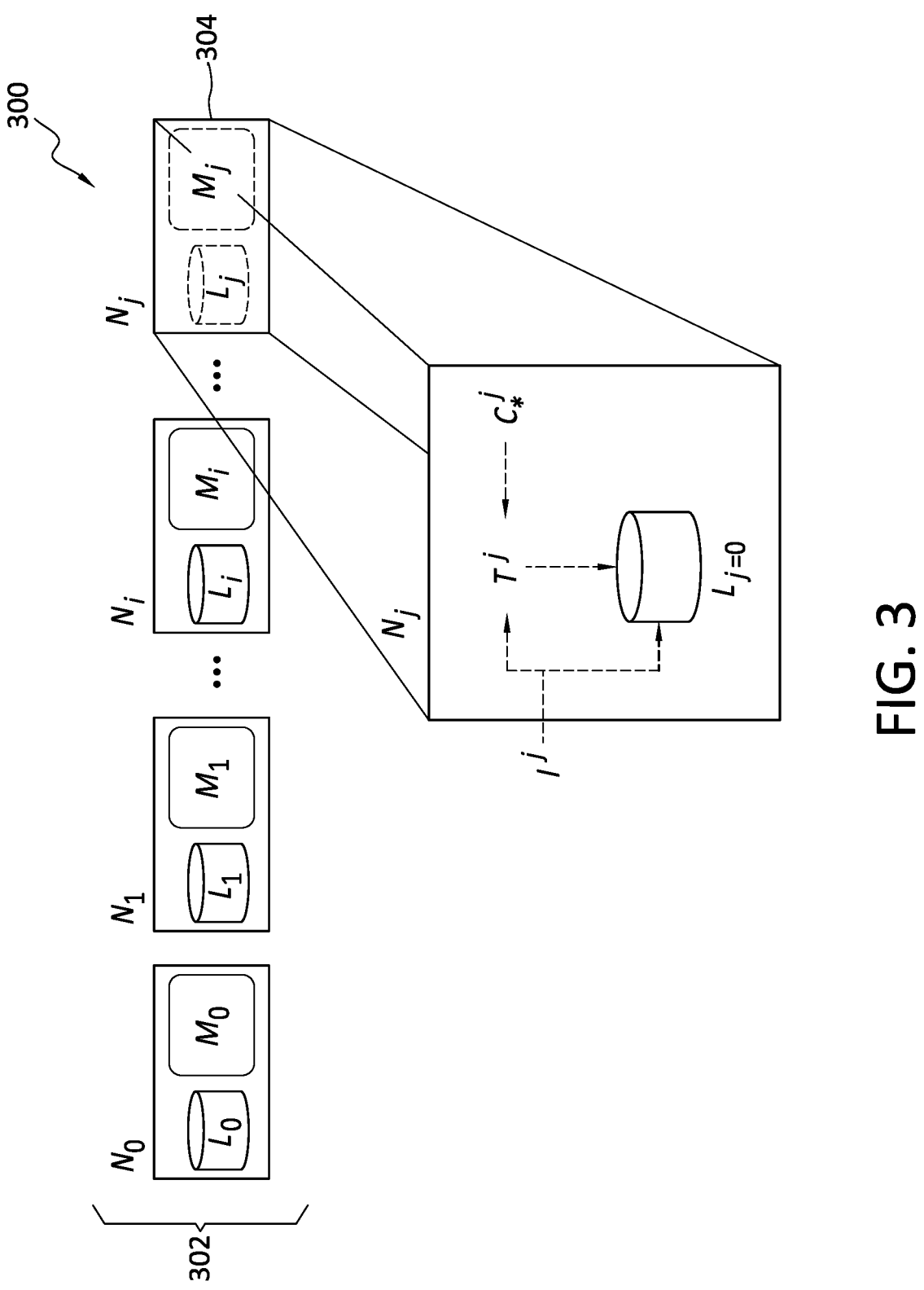
FIG. 3 discloses a representation of a system with a newly deployed node Nj, for which no local data or model are available.

Example embodiments may focus particularly on the second scenario, although a generalized method according to some embodiments may be employed for the first case as well. In this discussion, reference will be made to a newly deployed node $N_j$, which may comprise an existing node in the Scenario 1 above. Thus, a system 300 comprising multiple nodes 302, and a newly deployed node $N_j$ 304, is disclosed in FIG. 3. More particularly, FIG. 3 discloses an example embodiment of a system 300 that includes a newly deployed node $N_j$ 304, for which no local data or model are available. The initial state of the newly deployed node $N_j$ 304 is highlighted with broken lines to represent that the flows of data between components of the system 300 may not be taking place yet.

Because the node Nj 304 does not, in this example, presently possess a model Mj, the node Nj 304 must assume a default parameter configuration Cj for performing the domain task $T^j$. Different domains may enable different methods for determining appropriate initial configurations of a node. Some embodiments may be able to quickly determine are placement configuration $C^j$ for the initial configuration $C^j$. This is a result of quickly bootstrapping and deploying a model $M_j$. As noted, example embodiments may consider at least two cases. In the first case, one already-deployed node is selected to perform the bootstrap training process. In the second case, the newly deployed node performs the bootstrap training process itself. These are discussed in further detail below.

C.3.1 Example Bootstrap Training at an Already-Deployed Node

Figure 4:
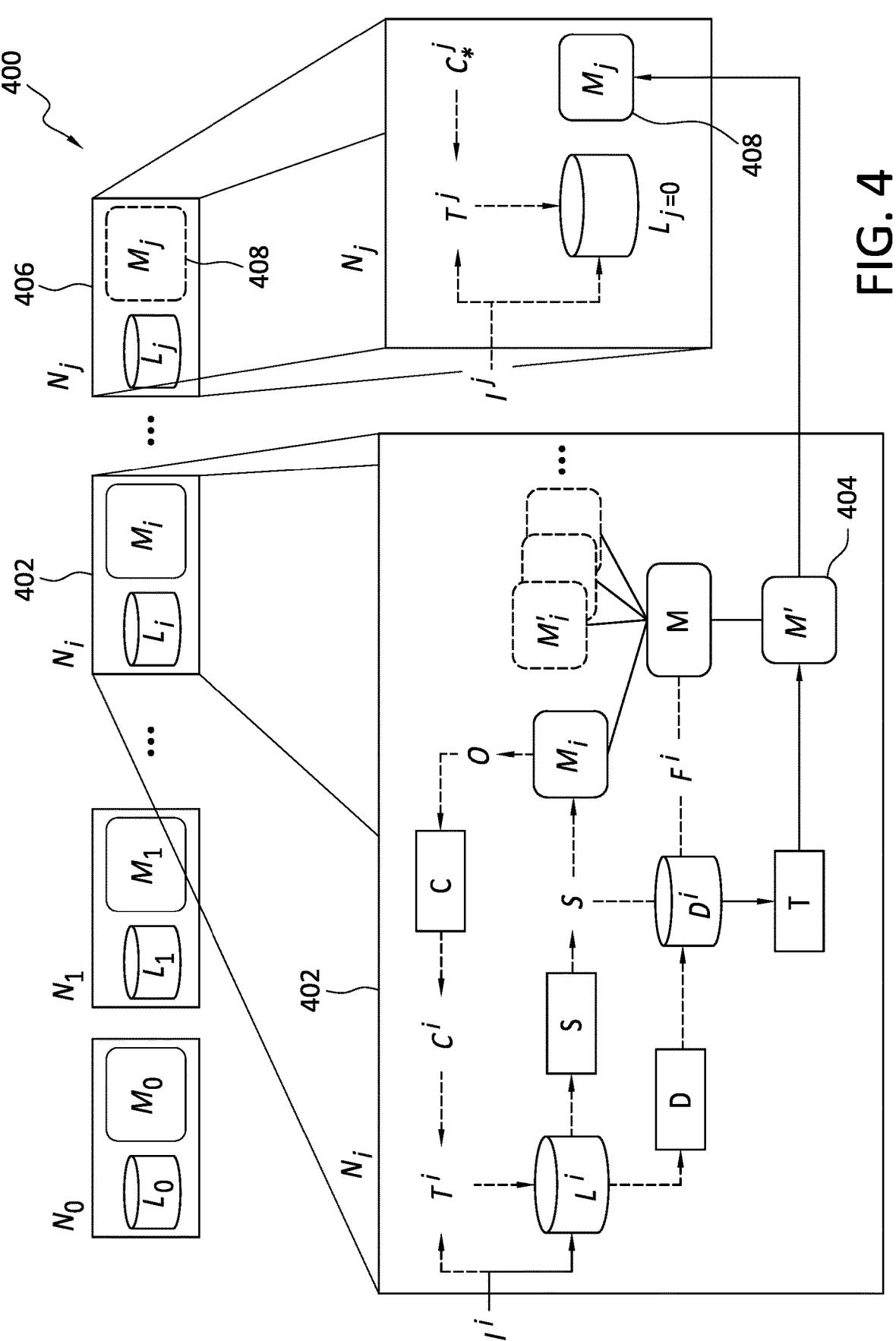
FIG. 4 discloses a representation of node Ni training a model M' for deployment in Nj.

If an already-deployed node—e.g. Ni—is selected for the bootstrap training, it may already contain its own, locally generated distilled dataset Di. In that case it should not require any communication of other nodes' distilled datasets D0, D1, . . . . This scenario is represented in FIG. 4. In particular, FIG. 4 discloses a configuration 400 that includes a node $N_i$ 402 training a model M' 404 for deployment in the node $N_j$ 406.

The node $N_i$ 402 must have enough computational resources available and/or idle to perform both the bootstrap training, and its own task $T_i$. Otherwise, the node $N_i$ 402 may cease to perform the distillation process, that is, the node $N_i$ 402 may stop populating $D^i$ via the procedure D, during this period. As well, if it lacks adequate computational resources, the node $N_i$ 402 may cease performing the procedure S to generate states, and therefore also cease to run the model $M_i$ and the procedure C. Finally, the node $N_i$ 402 may cease to perform the task $T^i$ itself temporarily. In FIG. 4 this is represented by dashed lines.

After a model M' 404 is trained, it may be transferred to node $N_j$ 406. Any compression scheme may be applied to avoid communication overhead. In particular, if the structure of M' 404 is known, only the weights have to be transferred. This implies a relevant communication overhead if the model is large but should be manageable for many reasonable use cases.

It is noted that the bootstrap training at node Ni 402 may be independent of node $N_j$ 406 and thus can be started even before node $N_j$ 406 is deployed. This may allow for a relatively fast bootstrapping of node $N_j$ 406. On the other hand, because little or nothing may be known about node $N_j$ 406, the resulting bootstrap model may not be the most attuned to the newly deployed $N_j$ 406 input data. There may be no way of knowing, at least without additional orchestration mechanisms and communication across nodes, for example, if an alternative already-deployed node $N_k$ could have generated a model that will require less fine-tuning in $N_j$.

The node Nj 406 receives the model, or the appropriate data, and assumes it as model Mj 408. As soon as the node Nj 406 has enough local data Li, that is, input, telemetry and task output, the node Nj 406 can use the model Mj 408 like the other nodes, as described earlier herein.

Embodiments of an approach in which an already-deployed node is bootstrapped, as described above in connection with FIG. 4, may have various advantages. Such advantages may include, but are not limited to: communication overhead is limited to the sending of the (compressed) model to the newly deployed node; the bootstrap model may be trained independently of the setup of the newly deployed node; and, the bootstrap model may potentially be deployed very fast at the newly deployed node. On the other hand, embodiments of an approach in which an already-deployed node is bootstrapped, as described above in connection with FIG. 4, may be less than optimal in some respects, for example: depending on the model structure and network constraints, the communication overhead for transferring the model to the already-deployed node may be significant; this approach may impose a computation overhead—for the training of the model—on already deployed node; and, the model generated may be initially representative of a node whose operation may be distinct from that of the newly deployed node—thus, this model may generate suboptimal or incompatible configurations at first; and require more fine-tuning for adaptation.

C.3.2 Example Bootstrap Training at a Newly-Deployed Node

Figure 5:
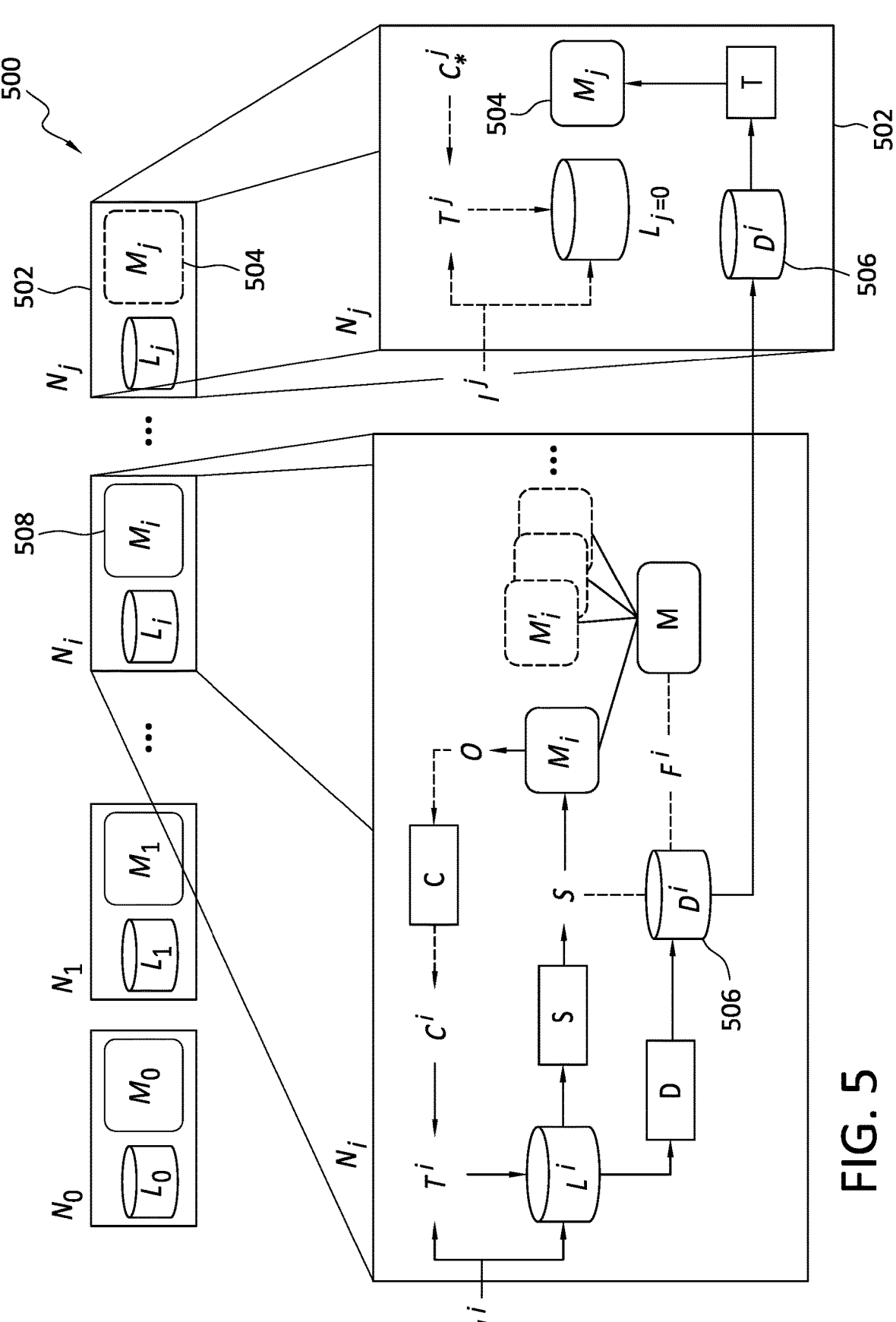
FIG. 5 discloses a node Ni that transfers its distilled dataset to the newly deployed node Nj, which then trains a model Mj locally.

In this case, and with reference to the configuration 500 in FIG. 5, the newly deployed node Nj 502 may train a model Mj 504 locally. To this end, node Nj 502 must receive enough input data. By the virtue of the distilled datasets collected in the other nodes being very compact, the node Nj 502 may be able to receive such data without significant transmission costs. With regard to a newly-deployed node such as node Nj 502, there may be at least two sub-cases, discussed in further detail below: using any distilled dataset Di 506 from any previously deployed node Ni; and, leveraging a synthetic state assembled in Nj 502 to select a distilled dataset Dk from a node Nk that indicates a similar mode of operation to node Nj 502.

C.3.2.1 Sub-Case 1 for Distilled Dataset-Using any Distilled Dataset $D_i$

This first sub-case may be relatively straightforward. Particularly, and with continued reference to FIG. 5, any node Ni 508 may transfer its distilled dataset to the newly deployed node Nj 502, which may then train a model Mj 504 locally. This approach may be advantageous for various reasons: only a very small communication overhead may be imposed, since only a distilled dataset is being transferred; and this approach may not impose any computation overhead on other nodes in the system. On the other hand, embodiments of this approach may be less than optimal in some respects, for example: the newly deployed node Nj 502 may have to allocate its compute resources to the training of the model Mj 504—this may impact the ability of the newly deployed node Nj 502 to perform the domain task Tj until the training is complete and, alternatively, the bootstrap model may some time to be deployed—if it is postponed in favor of Tj; and, the model Mj 504 generated may be, initially, unrepresentative of the operation of Nj, may generate suboptimal or incompatible configurations at first, and may require fine-tuning for adaptation.

C.3.2.2 Sub-Case 2 for Distilled Dataset-Selecting Based on State Similarity

Figure 6:
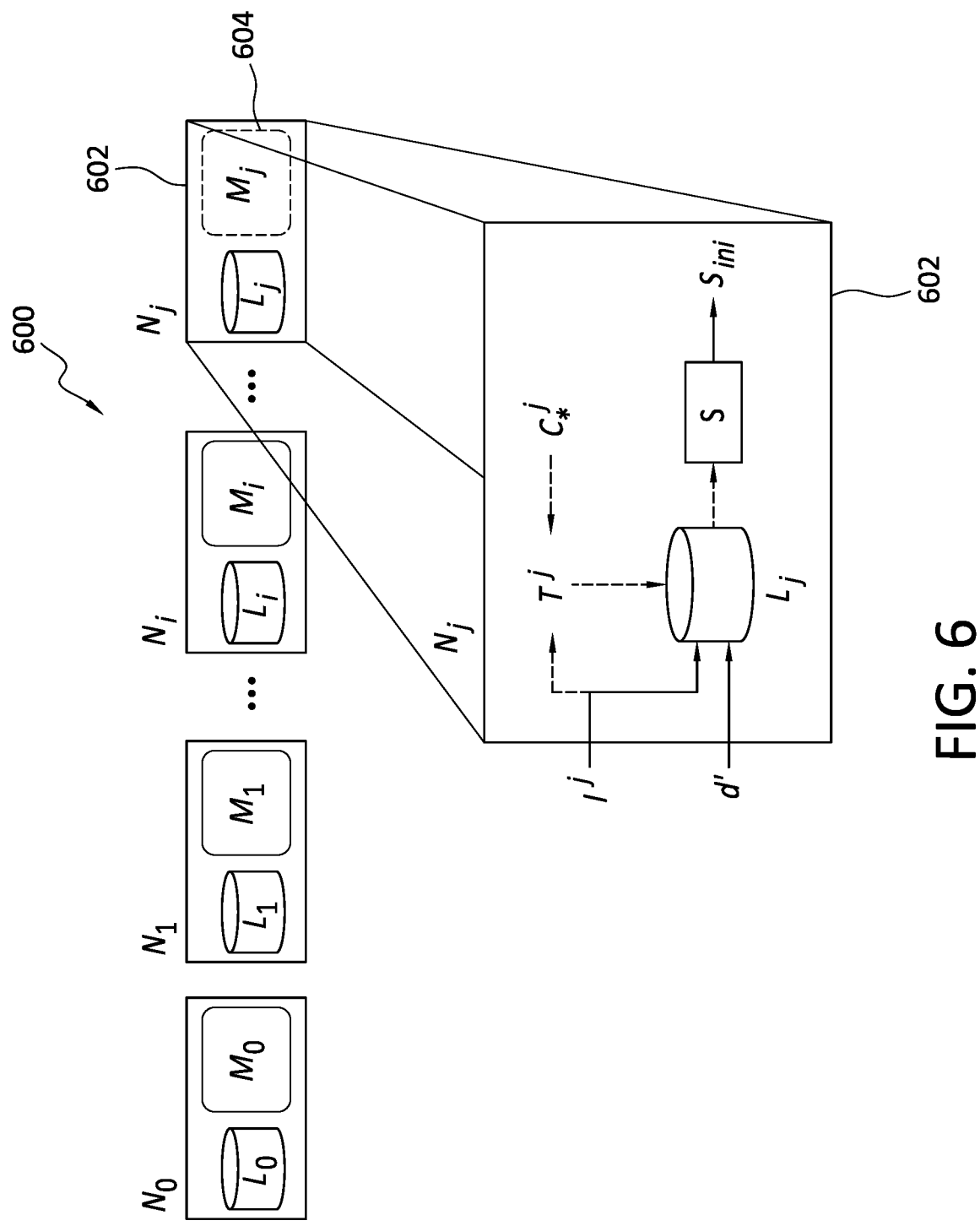
FIG. 6 discloses a composition of a synthetic state sini from partial input data Ij and baseline provenance and telemetry data d'.

With reference now to FIG. 6, a configuration 600 is disclosed that comprises a composition of a synthetic state sini from partial input data Ij and baseline provenance and telemetry data d'.

It is noted that soon after being deployed, the node Nj 602 may already begin collecting input data Ij. Even if this initial input data is not enough to perform the domain task Tj, it may already provide some useful indication of the typical state-space that this node Nj 602 will traverse. Hence, example embodiments may provide that as soon as a subset of input data d∈Ij is available, that subset may be coupled with baseline provenance and telemetry data d' to comprise a synthetic state sini as shown in FIG. 6.

The baseline provenance and telemetry data may be obtained from past executions of similar tasks in other nodes. If the newly-deployed node in question is a previously-deployed node that is re-training a model, it may use its own locally available telemetry and provenance (if any). This is depicted in FIG. 6.

It is noted that as soon as the task Tj is executed the typical scenario applies for composition of a 'regular' state as sini—and no baseline provenance and telemetry are required. Still, this may not happen as soon as sufficient input data Ij is collected for Tj. For example, because the node Nj 602 does not contain a model Mj 604 (shown in broken lines in FIG. 6), the available resources may be prioritized for the model bootstrapping. Thus, the scenario in FIG. 6 may take place even if a significant amount of data Ij is available.

With an initial state sini (synthetic or otherwise) composed at Nj we select a distilled dataset. The state s is broadcast to the nodes in the system. Each node compares the broadcast state sini to its locally available state(s). The node computes a similarity between the broadcast state sini and its locally available state(s). If more than one state is locally available, only the state most-similar to sini is considered (that is, only the greatest similarity score is considered).

Typically, each node may only contain a most-recently generated state; but in some domains a log of more states can be kept. This will be the case if storage constraints are not strict for the nodes, and/or if the states are used for other domain-specific tasks, other than as input for the model M. We do not deal with the specific case in which a node does not contain at least one state—each node Ni may also compose a current state, with its local data Li by the method S.

It is noted that this assumes a method capable of computing a state similarity score. While alternative methods may be employed on specific domains (wherein a state may carry additional, domain-dependent meaning), a general purpose algorithm is as follows. Let FS be a feature-vector comprising state s. A similarity score Q between two states a and b is given by the weighted sum of the absolute differences between Fa and Fb, thus:

$$Q(a, b) = \sum_i^{|W|} w_{[i]} \times abs\left(F_{[i]}^a - F_{[i]}^b\right)$$

where W is a weight-vector comprising one weight for each feature in both Fa and Fb.

Figure 7:
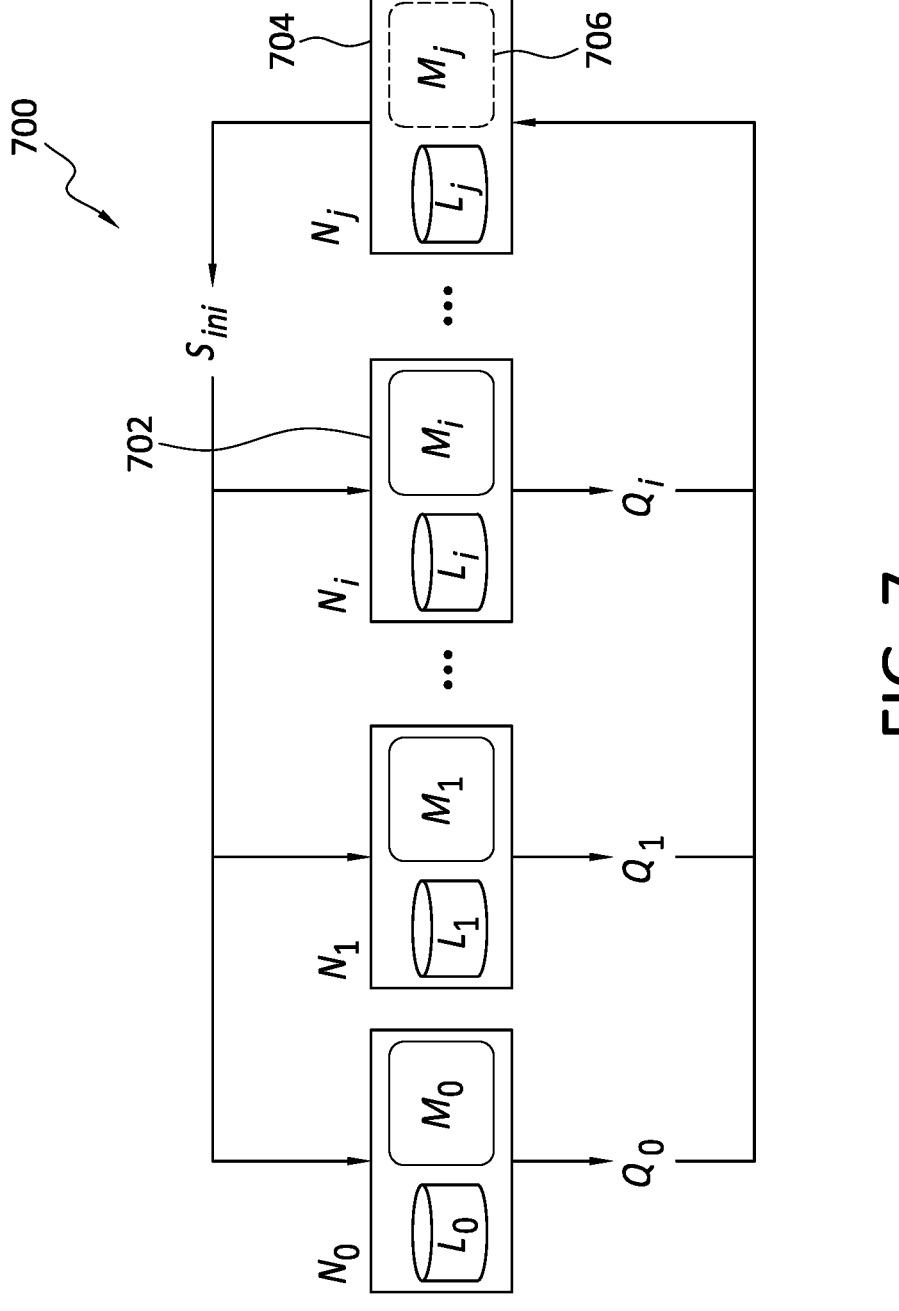
FIG. 7 discloses a state sini is used by one or more deployed nodes to compute a similarity score.

As shown in the example configuration 700 of FIG. 7, each node Ni 702 may communicate a single similarity score back Qi to the newly deployed node Nj 704. The node Nj 704 may then signal the node yielding the largest similarity Nk to transfer its distilled dataset Dk. Having received the distilled dataset Dk, the node Nj 704 may proceed to train a model Mj 706 locally, similarly to the case described above.

An approach involving selection of a distilled dataset based on state similarity may have various advantages, examples of which may include: a relatively small communication overhead—although a few communication steps are required, the data structures transferred across nodes may be minimal in their size, including the selected distilled dataset Nk; and, allowance for a bootstrapped model Mj that is built from a distilled dataset originating from a node Nk whose operation is likely similar to the operation of node Nj 704—in some instances at least, the bootstrapped model should be of higher initial quality and require less fine-tuning.

On the other hand, embodiments of this approach may be less than optimal in some respects, for example: this approach may impose a computation overhead on other nodes in the system—which have to compute similarity scores between sini and their locally available state(s)—the overhead may not be significant, but will be most noticeable in nodes that do not have a locally available state and compose one via the procedure S on the fly; this approach may require orchestration of communication steps between nodes, to broadcast state sini, receive the similarity scores, signal the selected node Nk, and receive the distilled dataset Dk. This may generate some communication-induced delay on the readiness of the model; and, this approach may require baseline provenance and telemetry to compose the synthetic state sini—these may be obtained from past executions of similar tasks in other nodes, but that may increases the number of communication steps between nodes further-alternatively, the state sini may be an actual state from local provenance and telemetry data.

D. Further Discussion

As will be apparent from this disclosure, example embodiments may be advantageous in various respects. For example, an embodiment may integrate the concept of dataset distillation into the domain of operational states in a way that lends itself to work in many different use cases. As another example, embodiments may implement an orchestration framework that enables knowledge sharing from a plurality of systems to allow for efficient, privacy-enhancing, training of models to predict operational states. This effectively allows performance of the bootstrap training of operational states models for a newly deployed node. A final example of some embodiments concerns efficiency and model readiness. Particularly, the bootstrap training itself may take place either in the newly deployed node, such as if a distilled dataset is obtained from another node, or at an already deployed node. Each approach may poses a respective set of tradeoffs. One option allows for readily available models but may impose some computational and communication overheads. Another option may impose very little overheads, but may postpone the readiness of the model. Yet another option may impose smaller overheads but may introduce potential communication delays on the readiness of the model. In any case, the knowledge sharing may be efficient because embodiments may apply dataset distillation in a novel context to compress the experience of many nodes into small synthetic datasets.

E. Example Methods

Figure 8:
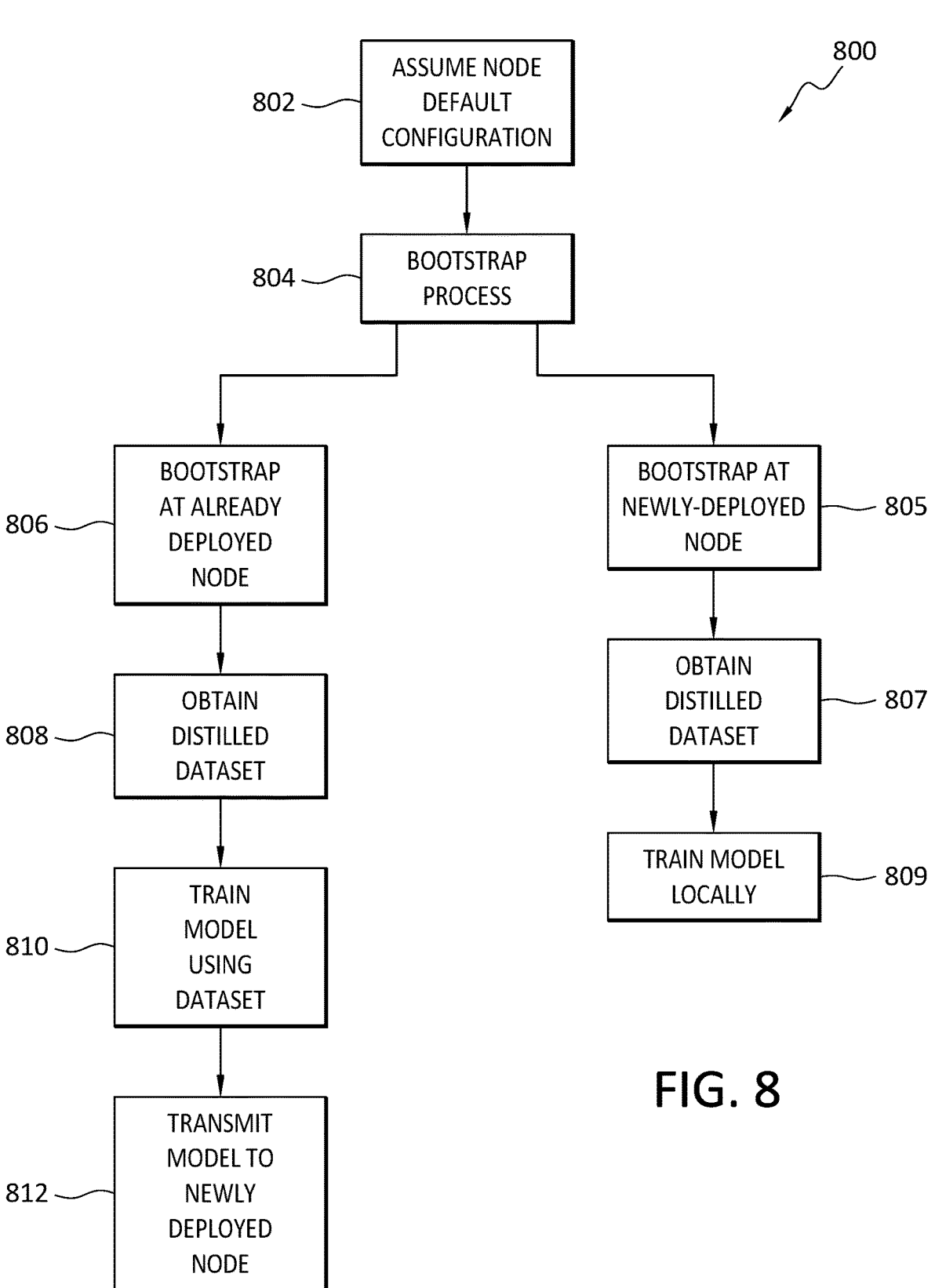
FIG. 8 discloses aspects of an example method according to some embodiments.

It is noted with respect to the example method of FIG. 8 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 8, an example method 800 is disclosed for bootstrapping a newly deployed node. As noted herein, other embodiments may be directed to bootstrapping a previously-deployed node.

The method 800 may begin at 802 where a node, such as a newly deployed node, takes on, or is set up with, a default configuration to enable performance of at least some basic operations. Next, a bootstrap process 804 may be performed. In general, the bootstrap process 804 may be implemented either at a previously deployed node, or at the newly deployed node itself.

In the case where bootstrapping is performed at a previously deployed node 806, the previously deployed node may initially obtain a distilled dataset 808. The distilled dataset may then be used to train 810 a model. The model, which may be in a compressed form, may then be transmitted 812 to the newly deployed node.

The method 800 may proceed differently when the bootstrapping 804 is performed 805 at the newly-deployed node. In this case, the newly deployed node may obtain a distilled dataset 807, and use the distilled dataset to train a model locally at the newly deployed node.

E. Further Example Embodiments

Following are some further example embodiments of the invention. These are presented only by way of example and are not intended to limit the scope of the invention in any way.

Embodiment 1. A method, comprising: at a node, installing a default parametrization configuration that facilitates performance of a domain task; obtaining, by the node, a distilled dataset, and obtaining the distilled dataset comprises either: obtaining the distilled dataset from another node; or leveraging a synthetic state assembled in the node to select the distilled dataset from another node based on state similarity of the node to the another node; training a model at the node, and the training is performed using the distilled dataset, wherein the model is operable to leverage information received by the node to propose changes to the parametrization configuration so as to optimize execution of a task by the node.

Embodiment 2. The method as recited in embodiment 1, wherein the information received by the node comprise telemetry and provenance data associated with the node.

Embodiment 3. The method as recited in any of embodiments 1-2, wherein the synthetic state comprises input data received by the node, and baseline provenance and telemetry data.

Embodiment 4. The method as recited in any of embodiments 1-3, wherein the distilled dataset is received at the node in response to a broadcast from the node.

Embodiment 5. The method as recited in any of embodiments 1-4, wherein the distilled dataset is selected from another node based on state similarity information received from the another node by the node.

Embodiment 6. The method as recited in any of embodiments 1-5, wherein the node is a newly deployed node.

Embodiment 7. A method, comprising: generating, by a node, a distilled dataset; determining, by the node, that the node has adequate resources to perform a task; training a model at the node so as to produce a trained model, and the training is performed using the distilled dataset; transferring the trained model to a newly deployed node, and the trained model is operable to leverage information received by the newly deployed node to propose changes to the parametrization configuration so as to optimize execution of a task by the newly deployed node.

Embodiment 8. The method as recited in embodiment 7, wherein when the newly deployed node has adequate local data, the newly deployed node is able to operate the trained model.

Embodiment 9. The method as recited in embodiment 8, wherein the local data comprises input data, telemetry, and task output.

Embodiment 10. The method as recited in any of embodiments 7-9, wherein the model is trained by the node independently of a setup process performed at the newly deployed node.

Embodiment 11. The method as recited in any of embodiments 7-10, wherein the trained model is in a compressed state when it is sent from the node to the newly deployed node.

Embodiment 12. The method as recited in any of embodiments 7-11, wherein the model is trained before deployment of the newly deployed node.

Embodiment 13. The method as recited in any of embodiments 7-12, wherein the distilled dataset comprises telemetry and provenance information about the node.

Embodiment 14. The method as recited in any of embodiments 7-13, wherein the trained model is usable at the newly deployed node for transfer learning, data classification, and tuning of data received by the newly deployed node.

Embodiment 15. A method for performing any of the operations, methods, or processes, or any portion of any of these, disclosed herein.

Embodiment 16. A non-transitory storage medium having stored therein instructions that are executable by one or more hardware processors to perform operations comprising the operations of any one or more of embodiments 1-15.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), random access memory (RAM), read-only memory (ROM), electrically erasable programmable read-only memory (EEPROM), compact disk read-only memory (CD-ROM), flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
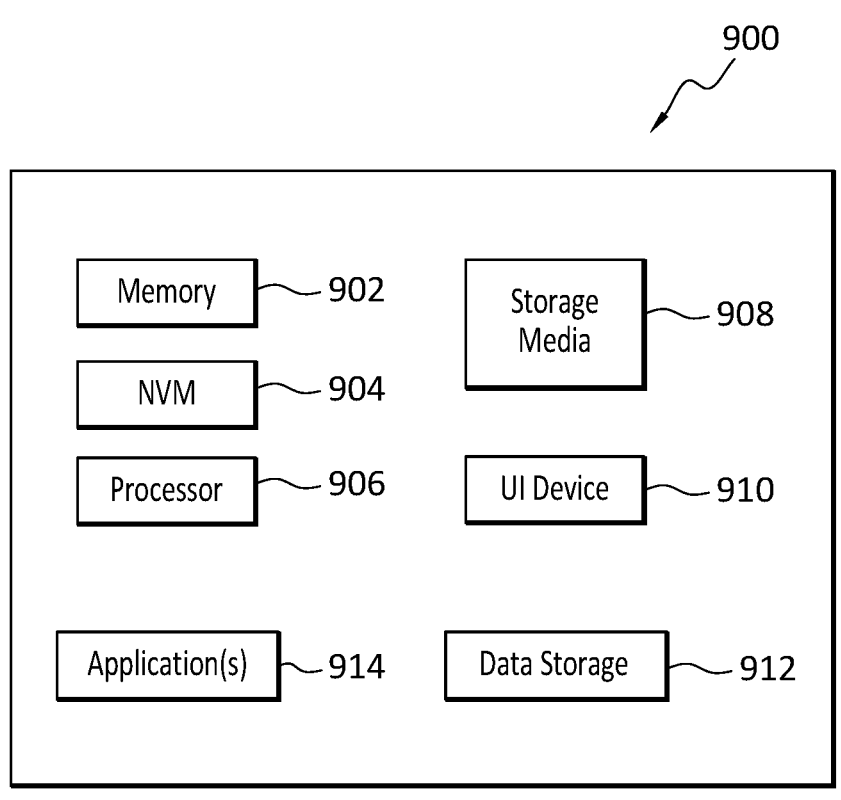
FIG. 9 discloses aspects of an example computing entity operable to perform any of the claimed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

at a node, installing a default parametrization configuration that facilitates performance of a domain task;

obtaining, by the node, a distilled dataset, and obtaining the distilled dataset comprises either:

obtaining the distilled dataset, which has been distilled from an original dataset by another node, has been used to train a model of the another node, and is much smaller than the original dataset, from the another node; or leveraging a synthetic state assembled in the node to select the distilled dataset from the another node based on state similarity of the node to the another node;

training a model at the node by using the distilled dataset, wherein the model is operable to leverage information received by the node to propose changes to the parametrization configuration so as to optimize execution of a task by the node.

2. The method as recited in claim 1, wherein the information received by the node comprise telemetry and provenance data associated with the node.

3. The method as recited in claim 1, wherein the synthetic state comprises input data received by the node, and baseline provenance and telemetry data.

4. The method as recited in claim 1, wherein the distilled dataset is received at the node in response to a broadcast from the node.

5. The method as recited in claim 1, wherein the distilled dataset is selected from another node based on state similarity information received from the another node by the node.

6. The method as recited in claim 1, wherein the node is a newly deployed node.

7. A non-transitory computer readable storage medium having stored therein instructions that are executable by one or more hardware processors to perform operations comprising:

at a node, installing a default parametrization configuration that facilitates performance of a domain task;

obtaining, by the node, a distilled dataset, which has been distilled from an original dataset by another node, has been used to train a model of the another node, and is much smaller than the original dataset, from the another node, wherein obtaining the distilled dataset comprises either:

obtaining the distilled dataset from the another node; or leveraging a synthetic state assembled in the node to select the distilled dataset from another node based on state similarity of the node to the another node; and training a model at the node by using the distilled dataset, wherein the model is operable to leverage information received by the node to propose changes to the parametrization configuration so as to optimize execution of a task by the node.

8. The non-transitory computer readable storage medium as recited in claim 7, wherein the information received by the node comprise telemetry and provenance data associated with the node.

9. The non-transitory computer readable storage medium as recited in claim 7, wherein the synthetic state comprises input data received by the node, and baseline provenance and telemetry data.

10. The non-transitory computer readable storage medium as recited in claim 7, wherein the distilled dataset is received at the node in response to a broadcast from the node.

11. The non-transitory computer readable storage medium as recited in claim 7, wherein the distilled dataset is selected from another node based on state similarity information received from the another node by the node.

12. The non-transitory computer readable storage medium as recited in claim 7, wherein the node is a newly deployed node.

13. A method, comprising:

generating, by a node, a distilled dataset, which has been distilled from an original dataset by the node, has been used to train a model of the node, and is much smaller than the original dataset;

determining, by the node, that the node has adequate resources to perform a task;

training a model at the node so as to produce a trained model by using the distilled dataset; and transferring the trained model to a newly deployed node, wherein the trained model is operable to leverage information received by the newly deployed node to propose changes to a default parametrization configuration so as to optimize execution of a task by the newly deployed node.

14. The method as recited in claim 13, wherein when the newly deployed node has adequate local data, the newly deployed node is able to operate the trained model.

15. The method as recited in claim 14, wherein the local data comprises input data, telemetry, and task output.

16. The method as recited in claim 13, wherein the model is trained by the node independently of a setup process performed at the newly deployed node.

17. The method as recited in claim 13, wherein the trained model is in a compressed state when it is sent from the node to the newly deployed node.

18. The method as recited in claim 13, wherein the model is trained before deployment of the newly deployed node.

19. The method as recited in claim 13, wherein the distilled dataset comprises telemetry and provenance information about the node.

20. The method as recited in claim 13, wherein the trained model is usable at the newly deployed node for transfer learning, data classification, and tuning of data received by the newly deployed node.

* * * * *